United States Patent
Shirai et al.

(10) Patent No.: US 6,571,273 B1
(45) Date of Patent: May 27, 2003

(54) PROCESS CONTROL SYSTEM

(75) Inventors: Toshiaki Shirai, Tokyo (JP); Naoki Ura, Tokyo (JP); Hiroshi Kumagai, Tokyo (JP); Umihiko Hoshino, Tokyo (JP); Takeshi Inoue, Tokyo (JP); Shuji Yamamoto, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/342,712

(22) Filed: Jun. 29, 1999

(30) Foreign Application Priority Data

| Jul. 13, 1998 | (JP) | 10-197033 |
| Apr. 5, 1999 | (JP) | 11-097539 |

(51) Int. Cl.[7] ............................................. G06F 15/16
(52) U.S. Cl. ..................................... 709/201; 345/788
(58) Field of Search ................................ 709/201, 220, 709/239, 315, 305; 700/86, 1, 18, 223; 710/200; 707/10; 345/840, 866; 358/1.9; 717/136

(56) References Cited

U.S. PATENT DOCUMENTS

| 3,801,962 A | * | 4/1974 | Moore et al. ................ 710/240 |
| 4,794,590 A | * | 12/1988 | Yano ........................... 370/400 |
| 4,926,375 A | * | 5/1990 | Mercer et al. ............... 709/201 |
| 5,068,778 A | * | 11/1991 | Kosem et al. .................. 700/9 |
| 5,371,895 A | * | 12/1994 | Bristol ........................ 717/136 |
| 5,386,503 A | * | 1/1995 | Staggs et al. ............... 345/788 |
| 5,388,258 A | * | 2/1995 | Larson et al. ............... 707/104 |
| 5,687,331 A | * | 11/1997 | Volk et al. .................... 345/840 |
| 5,761,522 A | * | 6/1998 | Hisanaga et al. .............. 712/1 |
| 5,796,936 A | * | 8/1998 | Watabe et al. ................. 358/1.9 |
| 5,841,656 A | * | 11/1998 | Taruishi ....................... 700/86 |
| 5,864,680 A | * | 1/1999 | Edblad et al. ............... 709/242 |
| 5,966,707 A | * | 10/1999 | Van Huben et al. .......... 707/10 |
| 6,009,466 A | * | 12/1999 | Axberg et al. ............... 709/220 |
| 6,055,463 A | * | 4/2000 | Cheong et al. .............. 700/223 |
| 6,067,577 A | * | 5/2000 | Beard .......................... 709/305 |
| 6,078,320 A | * | 6/2000 | Dove et al. .................. 345/866 |
| 6,141,720 A | * | 10/2000 | Jeffords et al. .............. 710/200 |
| 6,182,155 B1 | * | 1/2001 | Cheng et al. ................ 709/315 |
| 6,256,544 B1 | * | 7/2001 | Weissinger ..................... 700/1 |
| 6,266,726 B1 | * | 7/2001 | Nixon et al. ................. 710/105 |
| 6,424,872 B1 | * | 7/2002 | Glanzer et al. ................ 700/18 |

OTHER PUBLICATIONS

Herrman, Sharing Cde and Objects between Delphi and C++, www.tietovayla.fi/borland/techlib/BC360/bc360.html, 1996.*

Herrman, Sharing Code and Objects Between Delphi and C++, www.tietovayla.fi/borland/techlib/BC360/bc360.html.*

The GEDCOM Standard Release 5.5, www.gendex.com/gedcom55/55gcint.htm.*

McLaughlin, Code and Data Sharing on the Internet, http://students.cs.byu.edu/~dpm/thesis.html.*

* cited by examiner

*Primary Examiner*—Mark Powell
*Assistant Examiner*—Thong Vu
(74) *Attorney, Agent, or Firm*—Moonray Kojima

(57) ABSTRACT

An improved process control sytem wherein objects having functions for configuring a process control system are distributed and arranged in a plurality of computers connected to a network and each distributed and arranged object shares the functions of the process control system; information component cassettes are provided having individual information related to monitoring and operation and methods to display the information in an optimum display form, and the cassettes are provided according to the types of information; an information component deck is provided which arranges the information component cassettes and offers a unified interface for accessing the information component cassettes; and control objects are provided for controlling a plant and display objects for monitoring and operation of the plants, the control objects and display objects being related to each other and operated in association with each other.

20 Claims, 15 Drawing Sheets

PROCESS CONTROL SYSTEM

BACKGROUND OF THE INVENTION

1. Field of Invention

This invention relates to a process control system that performs control and operation of a plant by controlling the process variables thereof, such as temperature, pressure, etc.

2. Description of the Prior Art

Conventional process control systems usually comprise an information command station and a plurality of control stations connected to a communication bus, wherein the control stations handle plant control and the command station handles plant monitoring and operation. According to the scale of the plant that is the target of control, a plurality of control stations is distributed and arranged throughout the plant.

FIG. 1 shows a conventional process control system, wherein information command station ICS and a plurality of field control stations FCS are connected to communication bus BS. The field control stations FCS control plant PLT. According to the scale of the plant, a plurality of control stations are distributed and arranged throughout the plant. Information command station ICS comprises display unit 1 comprising, for example, a CRT (cathode ray tube) which has a man-machine interface function, etc.; display control unit 2 which controls the display unit 1 and causes display unit 1 to show various screens or windows required for plant control and monitoring; input unit 3 which may comprise, for example, a keyboard, a mouse, etc, and handles data input for plant operation and control, etc; monitoring unit 4 which monitors the plant; operation unit 5 which carries out operations for plant control with the results of monitoring and operation of the plant being displayed on the display unit 1; and communication unit 6 which exchanges data with each control station via communication bus BS according to a specified communication protocol.

Field control station FCS comprises control unit CU which handles control of plant PLT; and input-output unit (I/O unit) which receives various types of signals as inputs from or transmits signals as outputs to plant PLT. For example, an I/O unit inputs and/or outputs analog signals of 4 to 20 mA or 1 to 5 V, thermocouple signals, contact signals, etc. The FCS further comprises communication unit 11 which exchanges data with the information command station or with each field control station via the communication bus BS according to a specified protocol.

In each plant PLT, sensor SN detects a process value, such as temperature and pressure. The opening of valves V1 and V2 is control led by the manipulated signal provided by the field control station FCS. For example, an analog signal of 4 to 20 mA or 1 to 5 V provided by sensor SN is applied to I/O unit 10. Based on this input, control unit CU carries out control calculations and determines a manipulated variable. This manipulated variable is outputted from I/O unit as an analog signal of 4 to 20 mA or 1 to 5 V, which is used to control the opening of valves V1 and V2.

In the system of FIG. 1, plant control is executed by controlling the process variables, such as temperature and pressure, that exist in the plant.

FIG. 2 shows the status of storing data nd programs of a function block process in the control units of the system. Function blocks are the elements of a control system and, for example, include PID computation block (PID), indication block (PVI), etc. Various control systems are constructed by combining these function blocks. As shown in FIG. 2, data and programs are stored in database DB and program library PL, respectively. Data blocks to which tag names are attached are stored in the database DB. Examples of these tag names are: FIC101, PIC102, PI201. Programs used for processing the data of the function blocks corresponding to each data block are prepared in program library PL. More than one program is prepared because there are two or more algorithms for the processing of the function blocks.

Interpreter INT reads the data blocks in turn, selects and calls up a processing program specified in a read data block from the program library PL. The called up processing program executes calculation process using the data in the corresponding data block. For example, interpreter INT reads data block fIC101 , selects and calls up a processing program PID specified in the data block from program library PL. The processing program PID executes calculation processing using the data in the data block FIC101. However, the conventional system of FIG. 1 has the following problems:

Problem 1

Since each function, such as monitoring and control, is designed to have its optimum function, it is necessary to have individual dedicated hardware and software board (OS) for each function. For example, the control function mounted in control unit CU is designed on the premise of a dedicated interface for the I/O unit 10. Accordingly, physical restrictions are imposed on the control function so that the control function and the I/O unit 10 must be mounted on the same hardware, i.e. field control station fCS. In addition, if a function is to be mounted on a separate device, reconfiguration of the function is required, such as program modification or recompiling.

Problem 2

As shown in FIG. 2, programs and data are maintained separately. For the programs, algorithms for processing all types of function blocks in the system are integrated into the library. Thus, when changing an algorithm for function blocks, the entire program library must be updated even if only one algorithm for one type of function block is changed. Moreover, to change or add a function, it is necessary to recompile and reload the entire program library, which requires temporrary shut down of the entire system.

Problem 3

As shown in the program library of FIG. 2, the functions not being used are mounted and integrated together with the functions actually used. For this reason, the required range of shared parts increases regardless of whether the system is large or small in scale. This results in increased system cost even when constructing a small scale system. In other words, it is not possible to group functions according to the user's needs.

SUMMARY OF THE INVENTION

Accordingly, an object of the invention is to overcome the afore-mentioned and other problems, disadvantages and deficiencies of the prior art.

Another object is to provide a process control system which is more cost effective and offers better scalability or expandability of process control systems.

FIG; 5 is a diagram depicting an example of an object having control functions.

Figure 6:
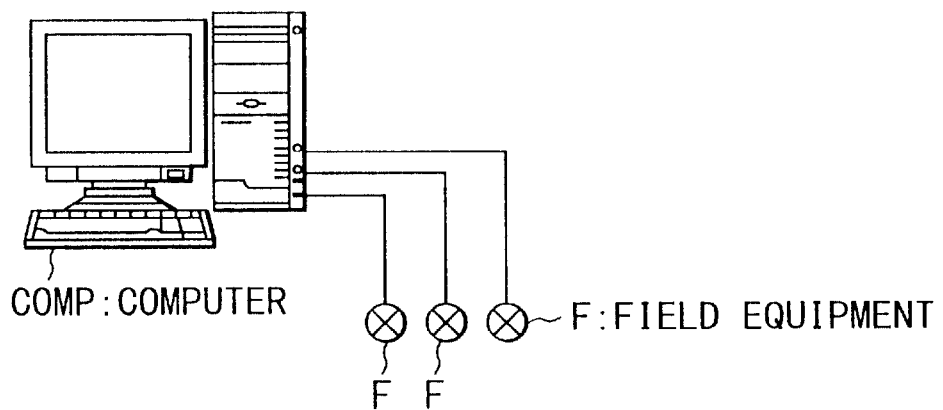

FIG. 6 is a diagram depicting a first example of a process control system according to the invention.

Figure 7:
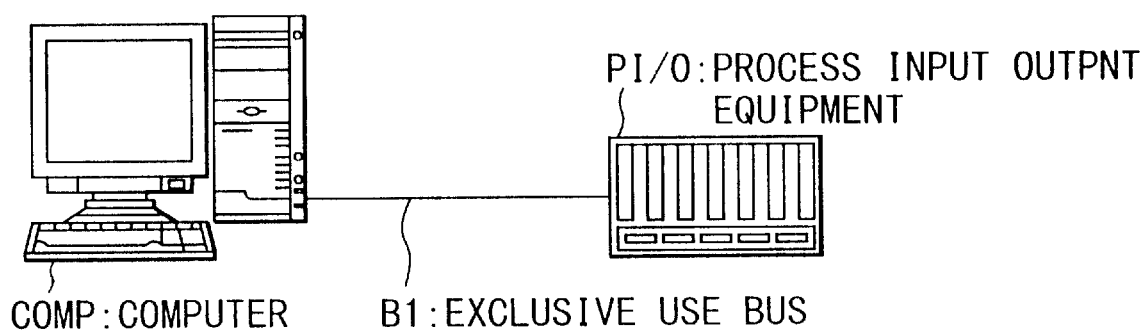

FIG. 7 is a diagram depicting a second example of a process control system according to the invention.

Figure 8:
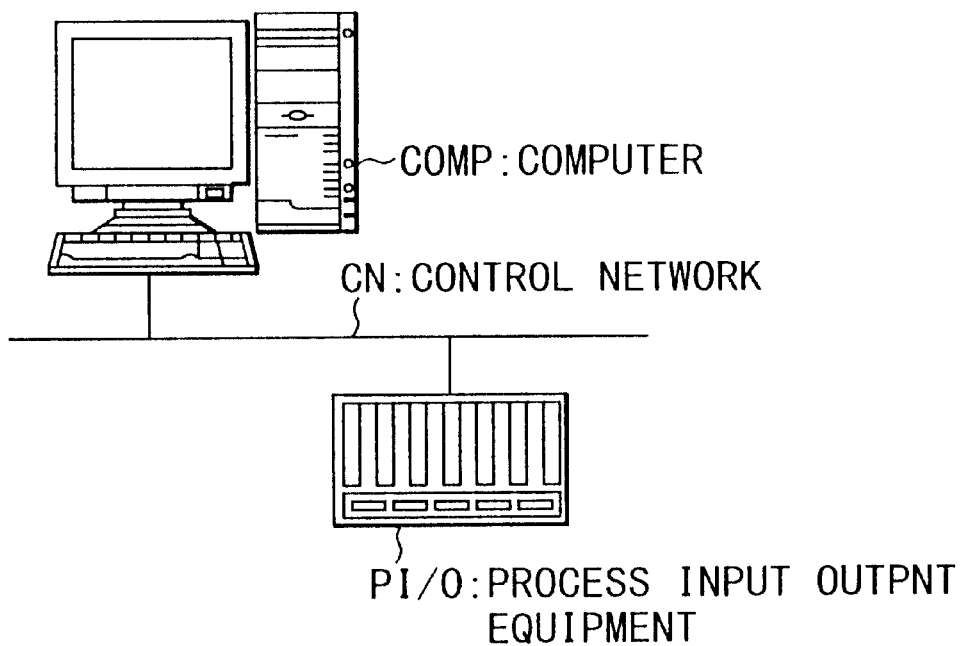

FIG. 8 is a diagram depicting a third example of a process control system according to the invention.

Figure 9:
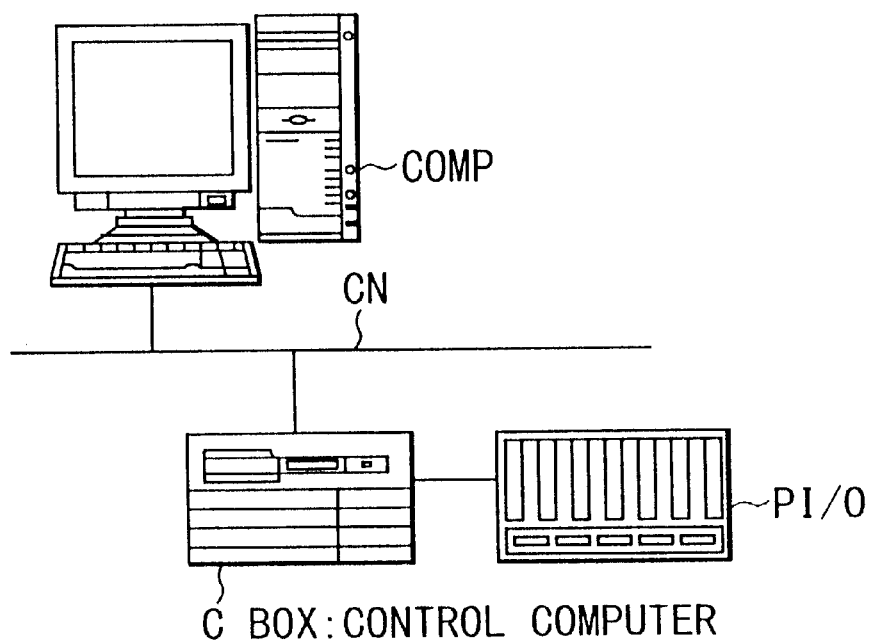

FIG. 9 is a diagram depicting a fourth example of a process control system according to the invention.

Figure 10:
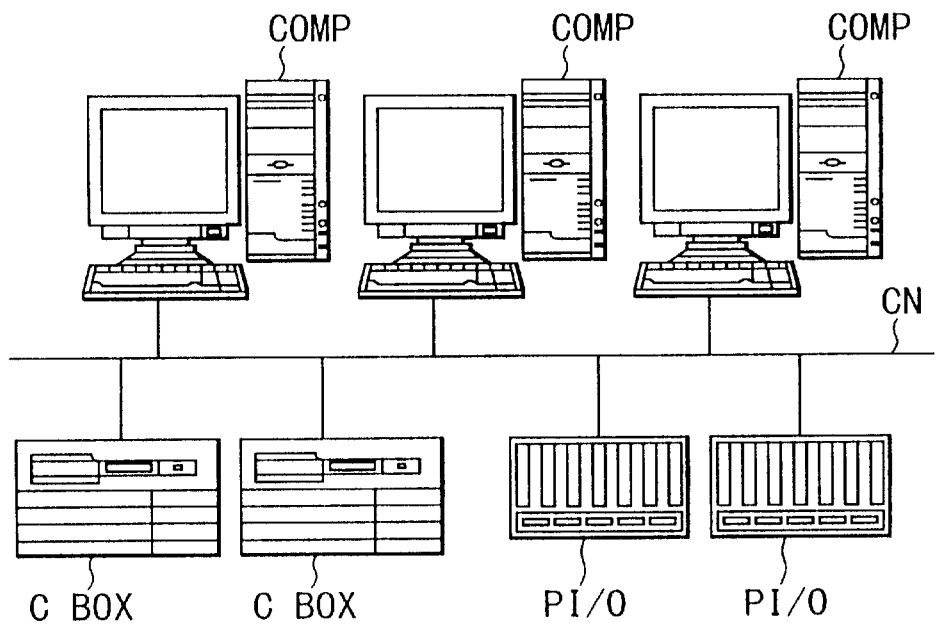

FIG. 10 is a diagram depicting a fifth example of a process control system according to the invention.

Figure 11:
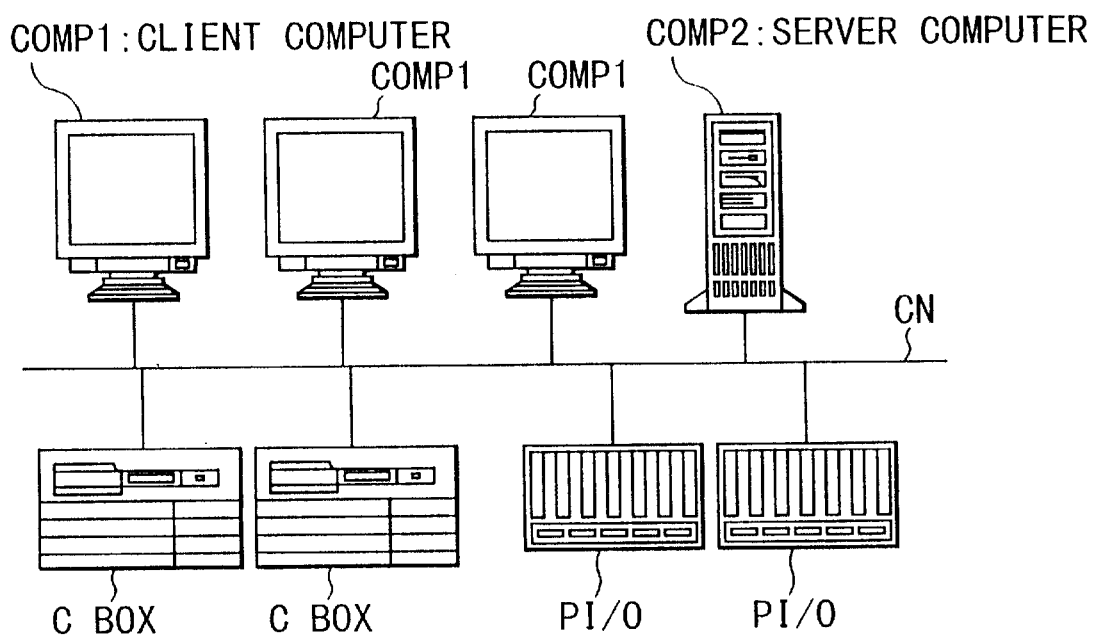

FIG. 11 is a diagram depicting a sixth example of a process control system according to the invention.

Figure 12:
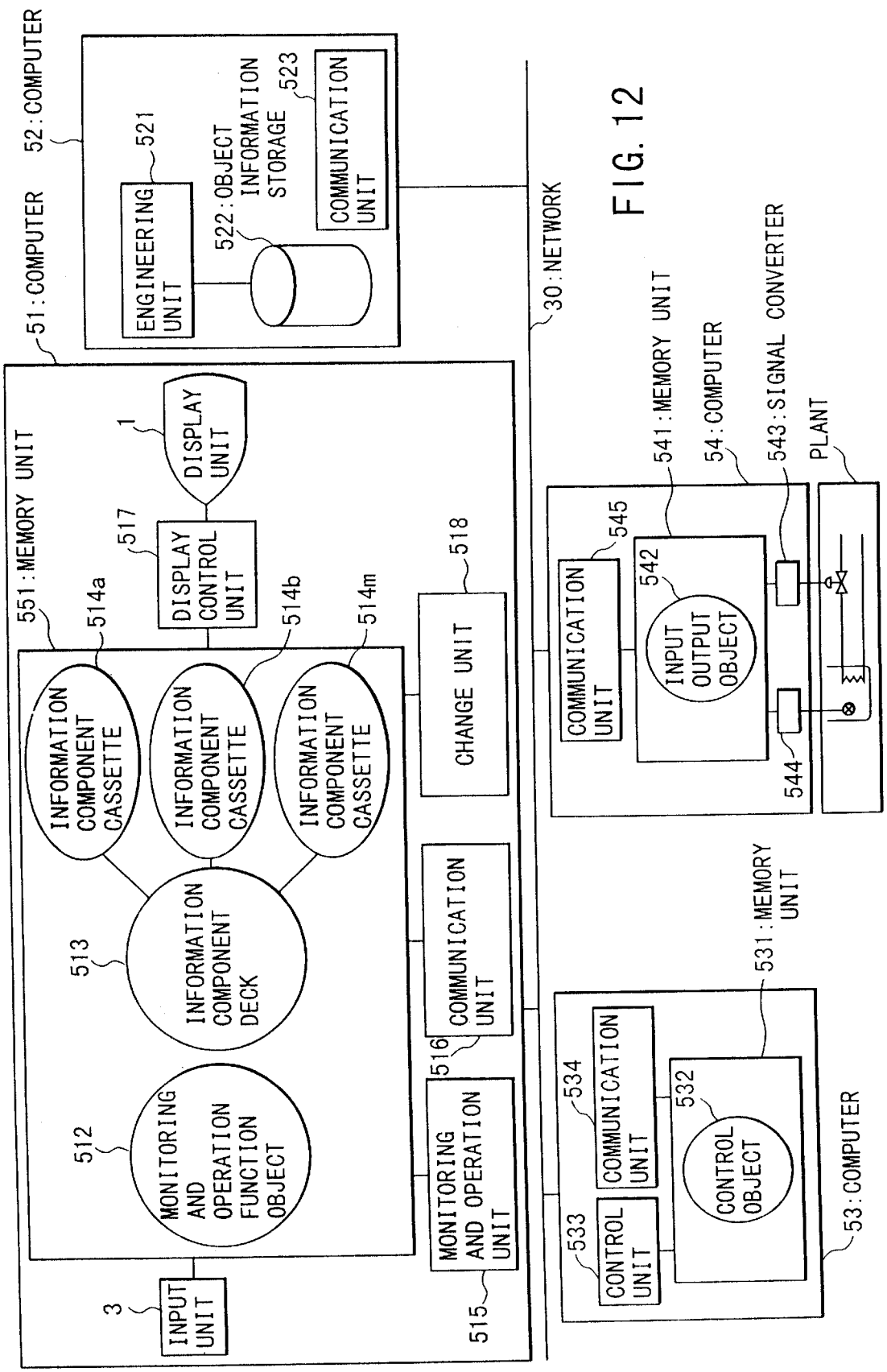

FIG. 12 is a diagram depicting a second illustrative embodiment of the invention.

Figure 13:
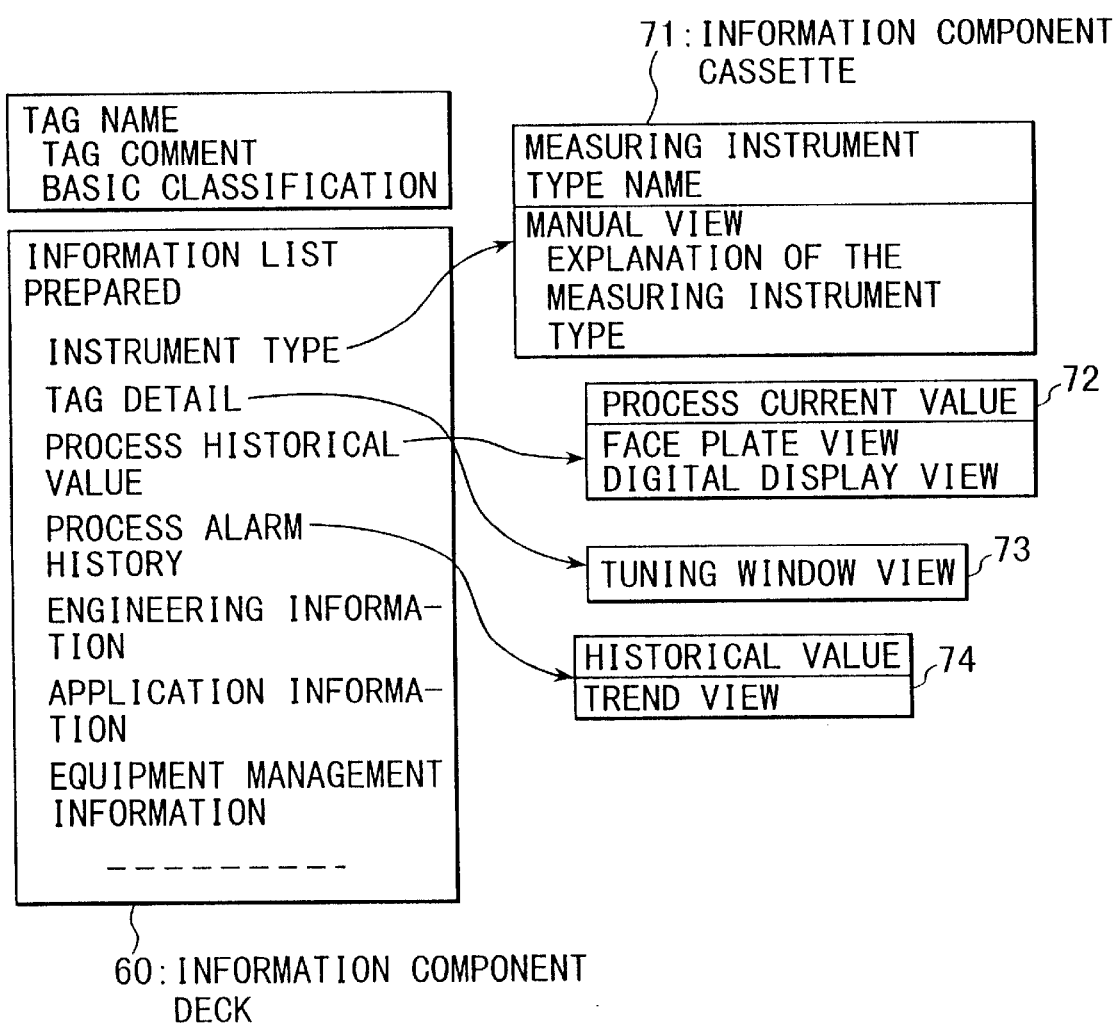

FIG. 13 is a diagram depicting an information component deck and an information component cassette.

Figure 14:
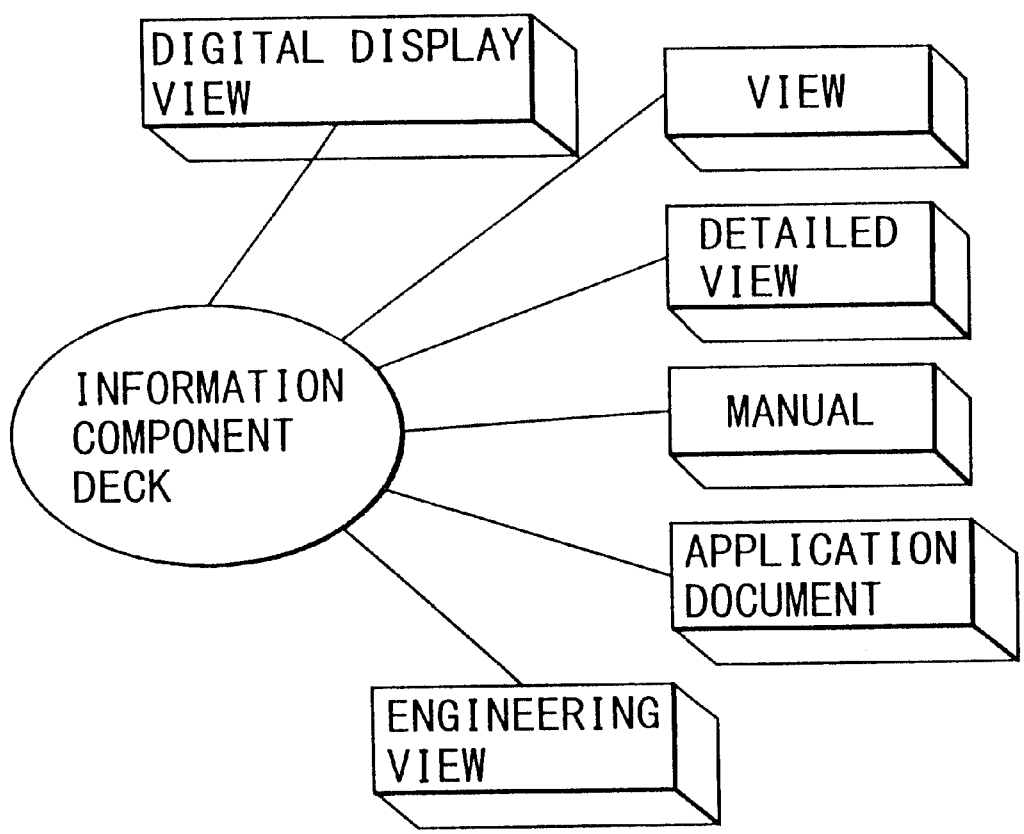

FIG. 14 is a diagram depicting an information component deck as viewed from the outside.

Figure 15:
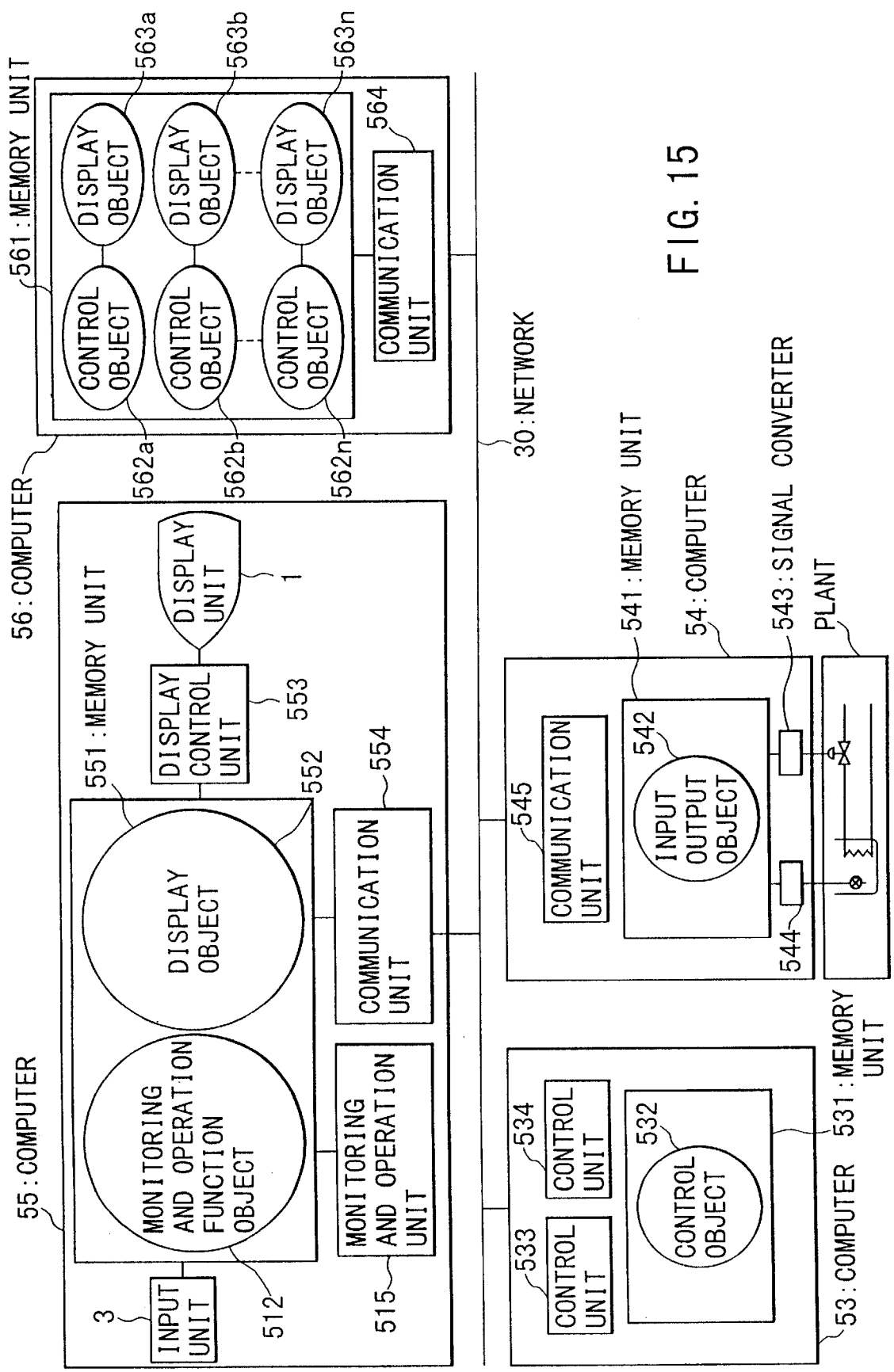

FIG. 15 is a diagram depicting a third illustrative embodiment of the invention.

Figure 16:
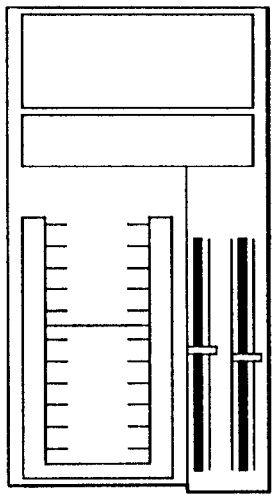

FIG. 16 is a pictorial view depicting an instrument face plate.

Figure 17:
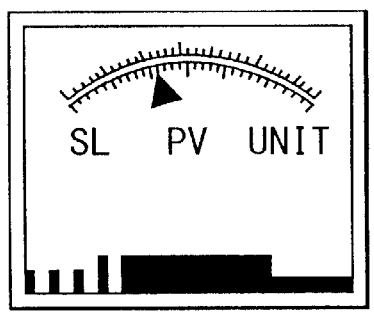

FIG. 17 is a pictorial view depicting a meter face plate.

Figure 18:
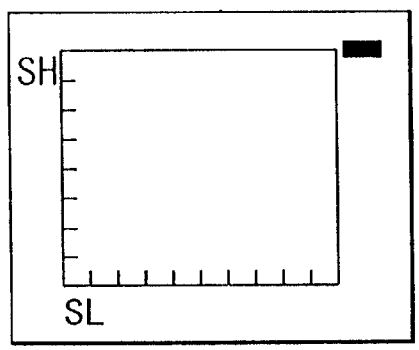

FIG. 18 is a pictorial view depicting a trend graph.

Figure 19:
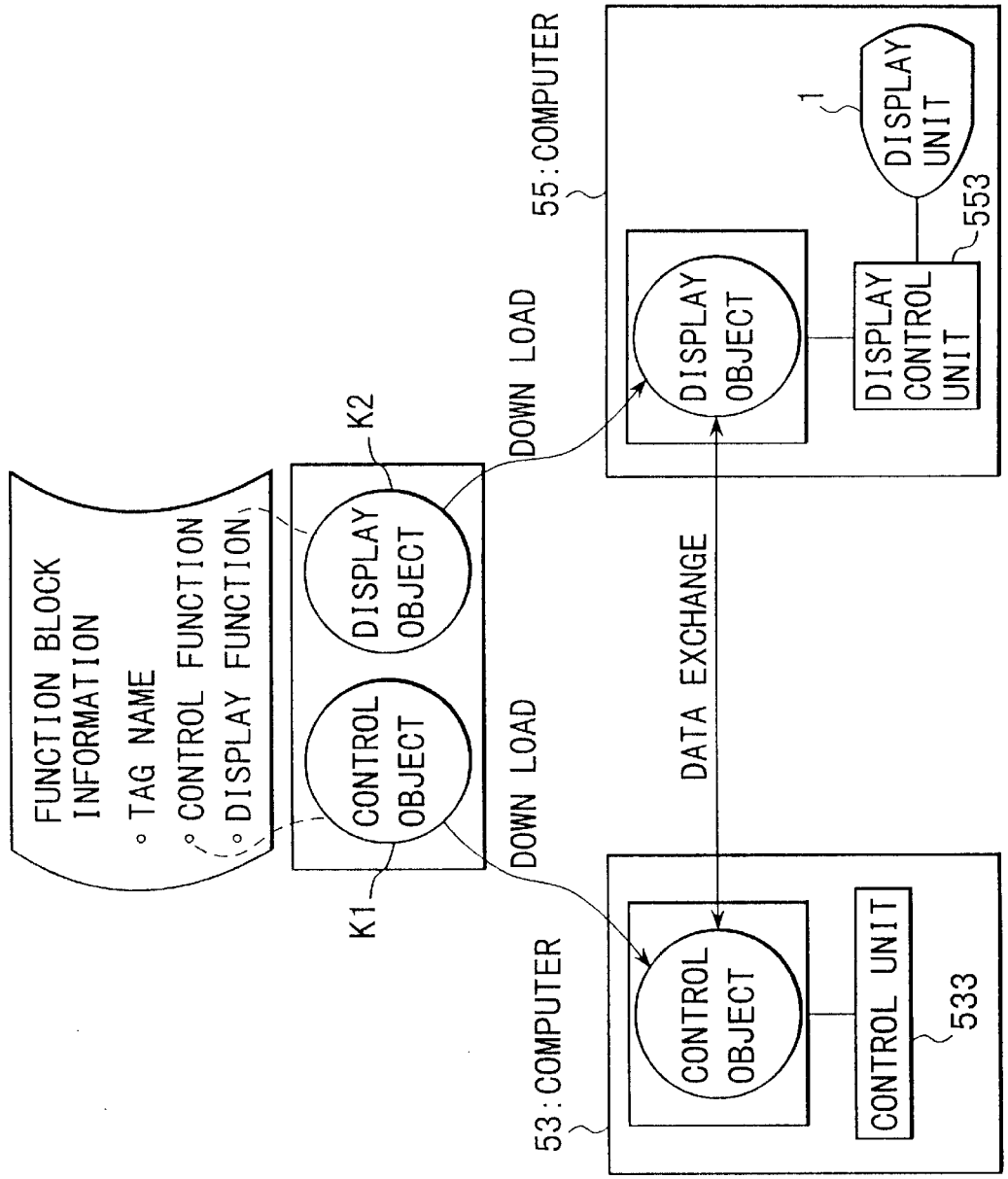

FIG. 19 is a flow chart depicting operation of the third embodiment of the invention.

Figure 20:
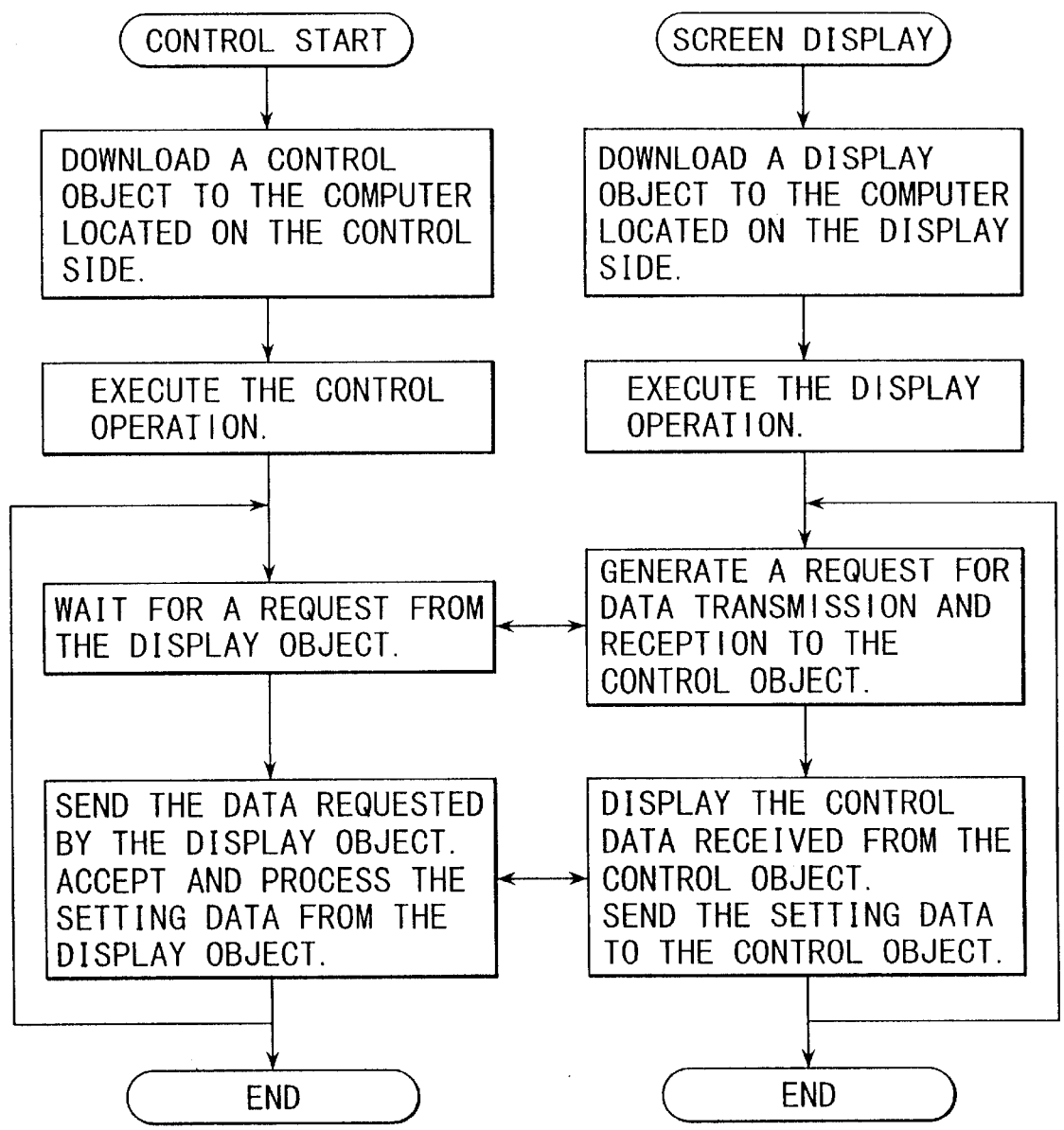

FIG. 20 is a flow chart depicting operation of the third embodiment of the invention.

DETAILED DESCRIPTION OF THE PREFERRED EMBODIMENTS

First Embodiment

Figure 3:
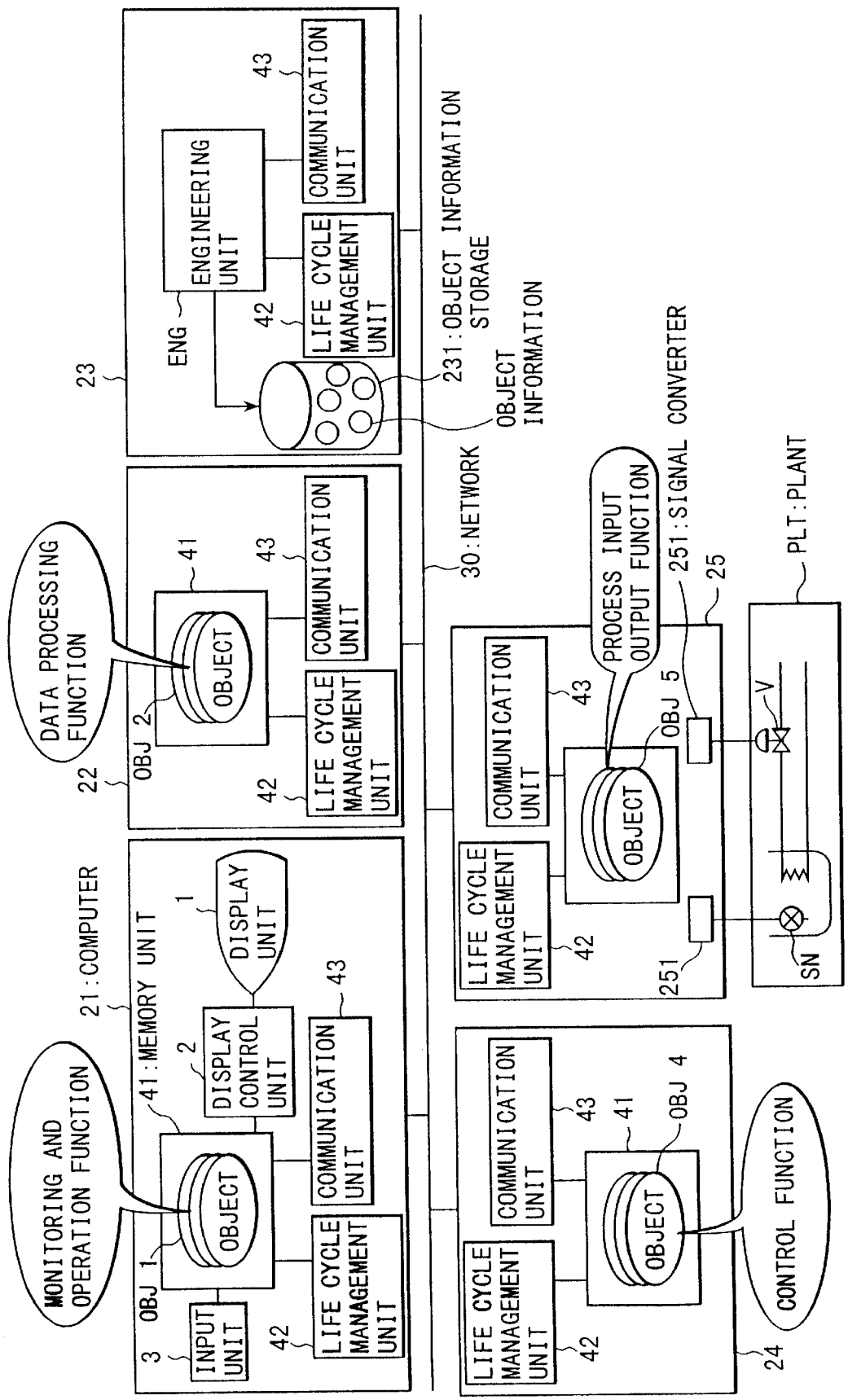
FIG. 3 is a diagram depicting a first illustrative embodiment of the invention.

FIG. 3 shows a first embodiment, which comprises: computers 21–25 connected to network 30. Each computer 21–25 is provided with a memory unit 41; life cycle management unit 42; and communication unit 43. In memory unit 41, objects having functions for configuring a process control system reside. The objects residing in memory unit 41 vary depending on the computer. Memory unit 41 may be, for example, the main memory of the computer. Life cycle management unit 42 manages creation, deletion, copying, movement, etc, of the objects. Life cycle management unit 42 may comprise, for example, a life cycle manager, name server, down load server, etc. The life cycle manager 42 creates an object when necessary and deletes the object when it is no longer needed or necessary. The name server manages the name of the created object. The down load server downloads an object to a computer in response to a request. Communication unit 43 implements communications between objects via network 30. A function, as a process control system, is performed by exchanging data between functions through communication between the objects.

Memory unit 41 of computer 21 stores the object OBJ1, which has monitoring and operation functions. The monitoring and operation functions are in charge of displaying information required for process control and of running operation of the process control. The monitoring and operation functions are provided in the information command station ICS in conventional systems.

The object OBJ1 is started by taking the input signal from input unit 3 as a message and operating the plant PLT via the objects with the control function and the objects with the process I/O function and causing display control unit 2 to display the result of the operation on display unit 1.

Figure 1:
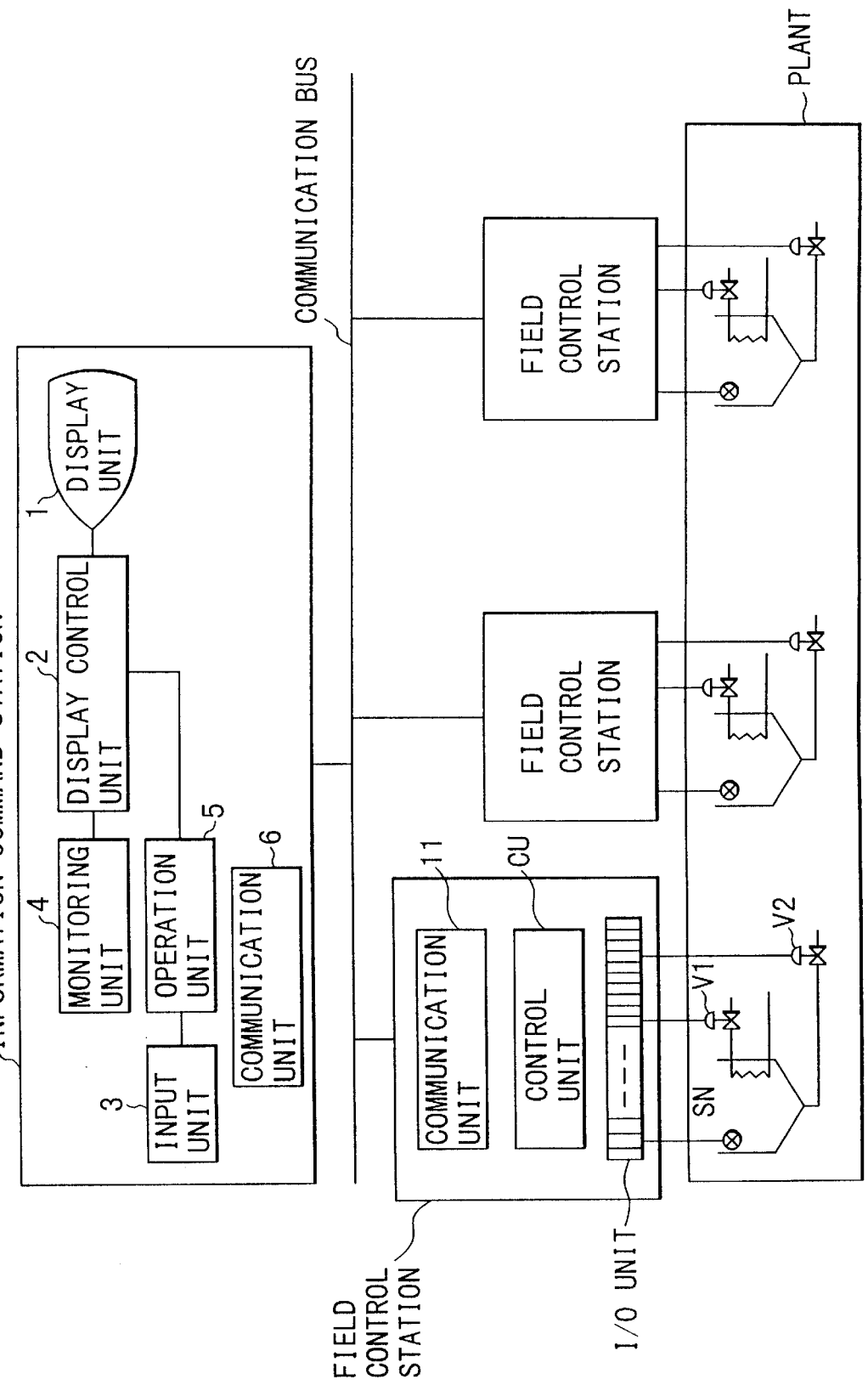
FIG. 1 is a diagram depicting a conventional process control system.
Figure 2:
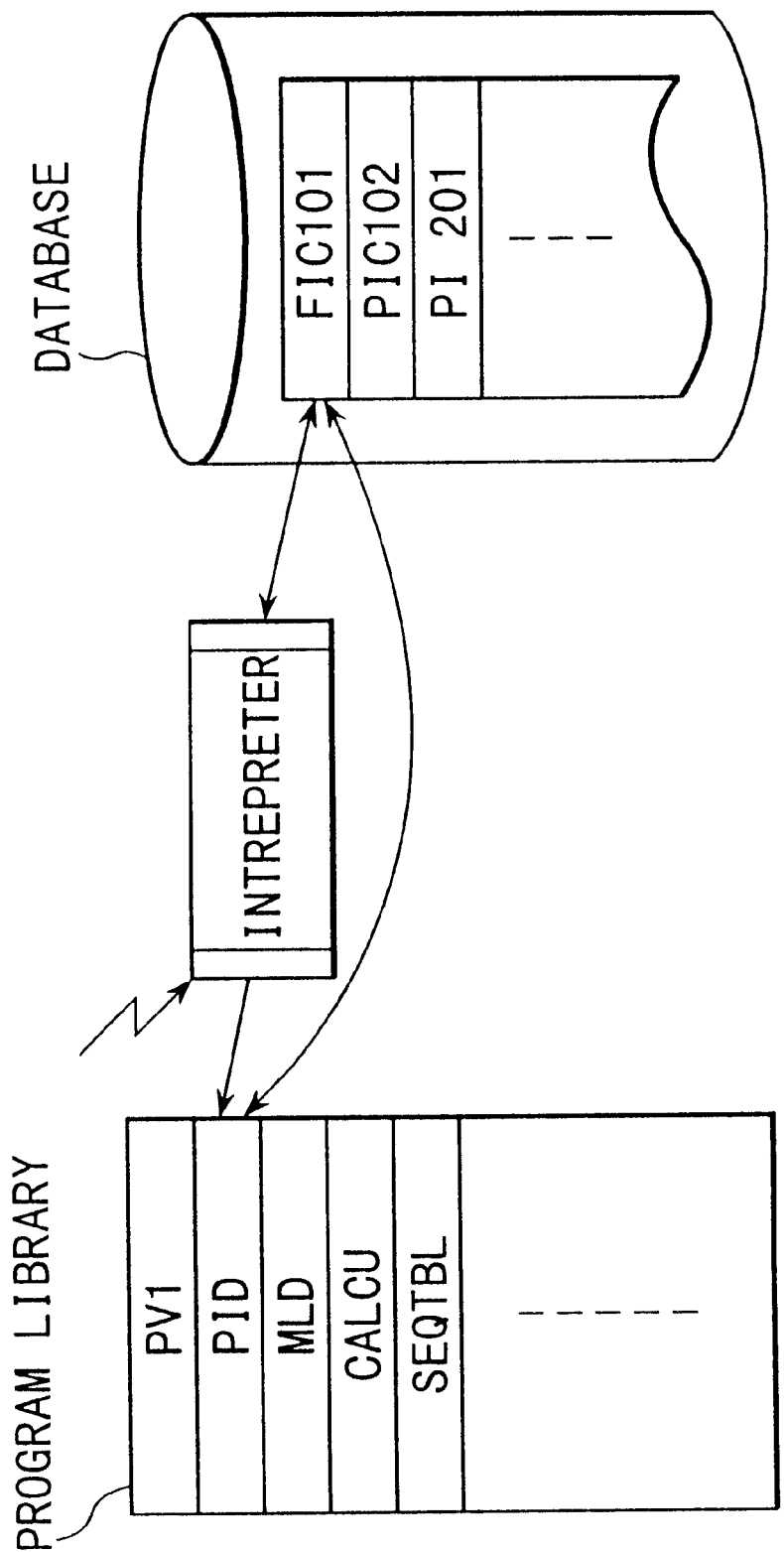
FIG. 2 is a diagram depicting the status of storing data and programs of a function block process in the control units of the system of FIG. 1.

Memory unit 41 of computer 42 stores object OBJ2 having the data process function. The data processing function provides sophisticated control and operation support by subjecting the data handled in the process control to secondary processing. The data processing function is provided in the information command station ICS and/or field control station FCS in the system of FIG. 1. The object OBJ2 carries out the process utilizing the dqta in the objects having the control function and the objects having the process input-output function.

Computer 23, for example, includes an engineering unit ENG, which defines and creates objects and constructs a system combining the objects. The engineering unit ENG may be configured with the objects. Object information storage 231 stores object information OD. The information of objects defined and created by the engineering unit ENG is stored in the object information storage 231.

The memory unit 41 of computer 24 stores object OBJ4, which has a control function. The control function is in charge of the process control. The control function is provided in the field control station FCS of FIG. 1. The object OBJ4, for example, performs control calculation based on the process inputs sent from sensor SN in the plant PLT to determine a manipulated variable. The manipulated variable is provided to valve V in plant PLT.

The memory unit 41 of computer 25 stores object OBJ5, which has a process input-output function. The process input-output function inputs or outputs plant signals handled in the process control system. The process input-output function is provided in I/O unit 10 of FIG. 1. The object OBJ5 works on signal converter 251 and exchanges signals with plant PLT. For example, object OBJ5 receives an analog signal of 4 to 20 mA or 1 to 5 V from sensor SN via signal converter 251 as an input signal and provides a manipulated variable signal of 4 to 20 mA or 1 to 5 V to valve V via signal converter 251.

In the foregoing cases, the object may be configured either with an object or a combination of several objects. Furthermore, one function may be provided by a plurality of objects. Also, an object having a display function to display only information required for process control may be provided in place of an object having monitoring and operation functions. Moreover, a configuration may be used wherein each object is individually independent and self sustaining. That is, each object is created as an object itself and as a component object.

The following configuration is adopted to make objects component in character:

(1) Life cycle management unit 42 is provided to manage the creation, deletion, copying and movement of the objects.

(2) An explicitly defined interface unit is provided to separate the definition of the interface unit and mounting of the objects.

Figure 4:
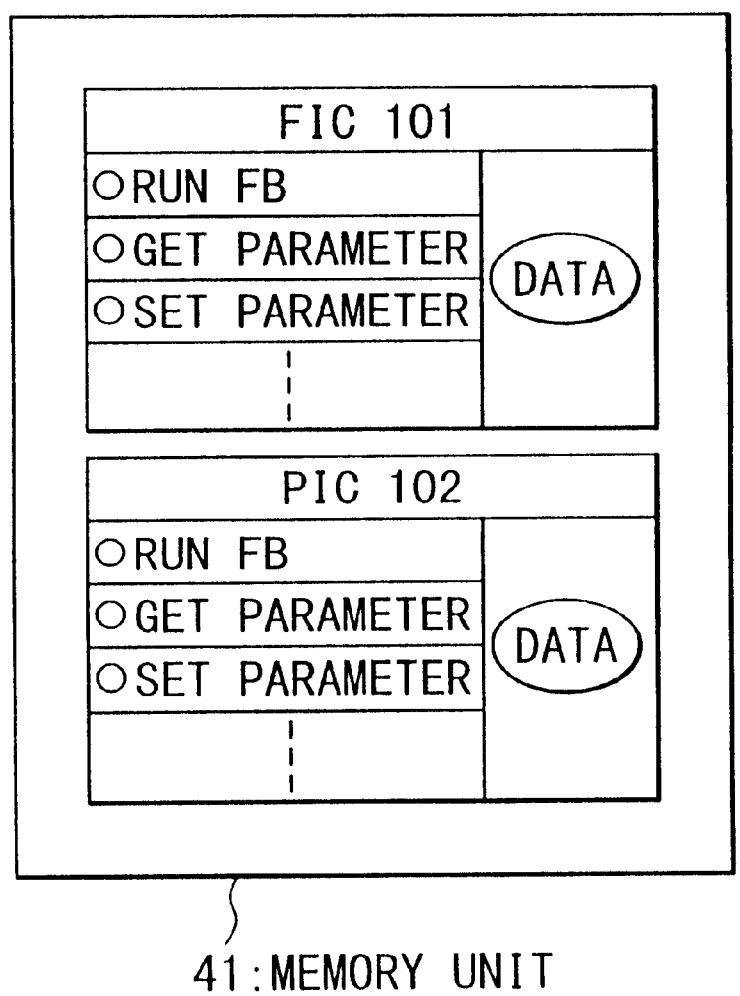
FIG. 4 is a diagram depicting an example wherein a function block is treated as an object.

FIG. 4 shows a functional block which is treated as an object, wherein a procedure or method and data are integrated in each of the objects which is then stored in memory unit 41 with a tag name. The method is equivalent to the program. FIC101 and PIC102 are tag names. Each object is provided with an execution processing method "RunFB", a reading processing method "GetParameter" and a writing method "SetParameter". An object, whose execution processing method "RunFB" is started up by a message or the like generated by a client computer, performs a calculation process on its data using the program stored inside the object.

As shown in FIG. 4, a procedure or method and data are encapsulated and handled in an integrated manner. Since a "tag" that is a unit identified as a function by the user is defined as an independent object, new functions can be added and existing functions can be changed or deleted for each tag. Furthermore, when addition, change or deletion is carried out, it does not affect the objects other than the objects whose functions are added, changed,or deleted. The execution processing method and all procedures related to the object are defined in each object as methods. Thus, each function can maintain its independence.

Figure 5:
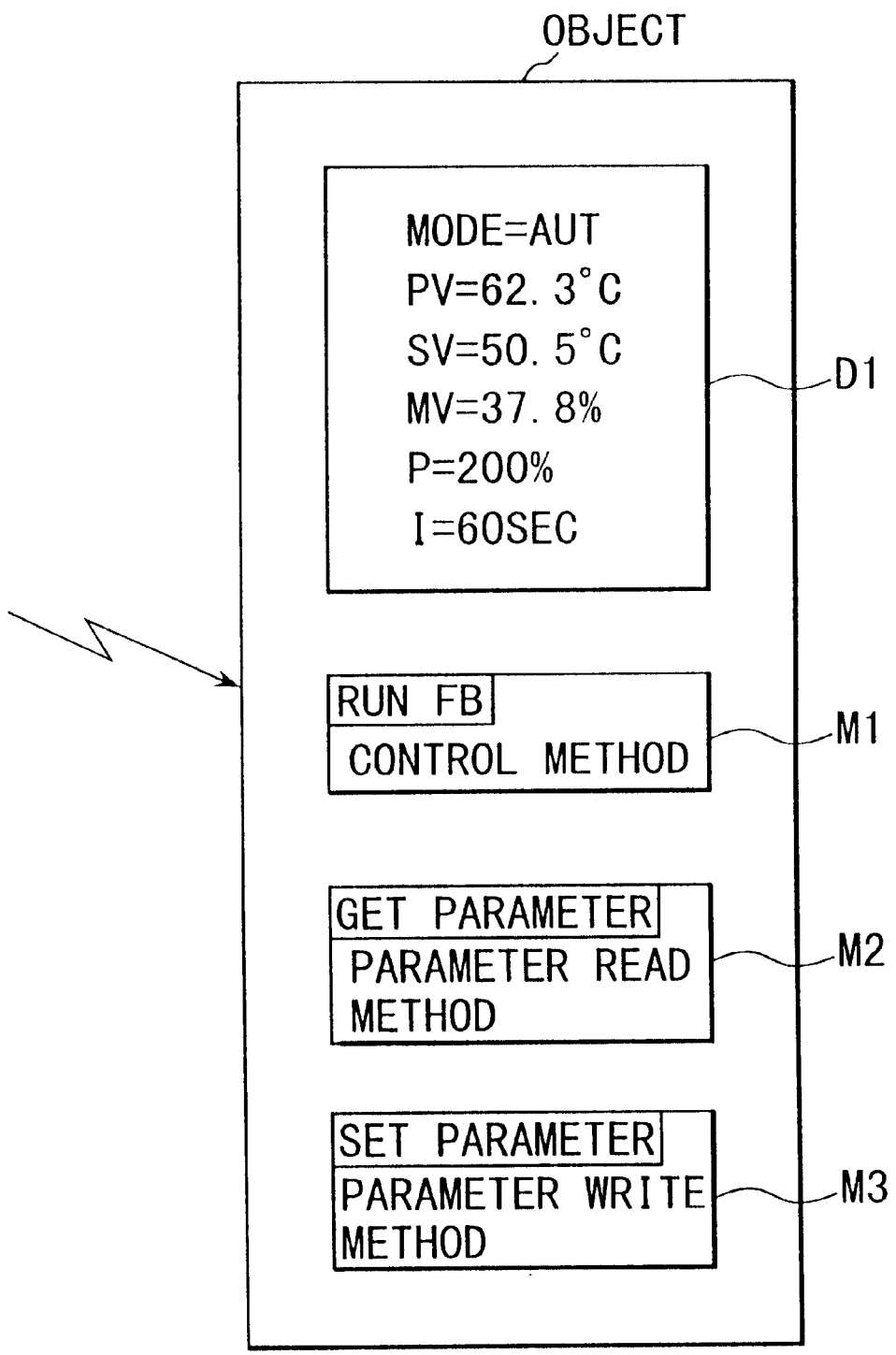

FIG. 5 shows an example of a configuration of an object with control functions, wherein the object OBJ with control functions is configured to integrate the data D1 and methods M1,M2 and M3. The object OBJ is an object to carry out PID control. Data D1 describes an operation mode, e.g. automatic operation mode AUT in FIG. 5, process variable PV, setting value SV, and process output value MV. Method M1 describes execution processing method "RunFB" and a control method for executing PID control. Method M2 describes reading processing method "GetParameter" and a program to read the parameters. Method M3 describes writing method "SetParameter" and a program to write parameters. When execution processing method "RunFB" is started up, PID control is executed by the control program using data D1. When reading processing method "GetParameter" is started up, specified parameters in data D1 are read. When writing method "SetParameter" is started up, parameters specified in data D1 are written.

FIGS. 6–11 show examples of a process control system according to the invention.

In the system shown in FIG. 6, several field equipment F are directly connected to computer COMP. All of the objects having functions to configure a process control system are mounted in computer COMP.

In the system shown in FIG. 7, process input-output equipment PI/O is connected to computer COMP with process I/O exclusive use bus B1. All of the objects having functions to configure a process control system are mounted in computer COMP.

In the system shown in FIG. 8, computer COMP and process input-output equipment PI/O are respectively conencted to control network CN. All of the objects having functions to configure a process control system are mounted in computer COMP. If the process input-output equipment has intelligence, the objects having process input-output functions may be mounted in process input-output equipment PI/O and other objects may be mounted in computer COMP.

In the system shown in FIG. 9, computer COMP and control computer CBOX are connected to control network CN and process input-output equipment PI/O is directly connected to control computer CBOX. The objects with control functions are mounted in control computer CBOX, and the other objects are mounted in computer COMP.

In the system shown in FIG. 10, a plurality of computers COMP, a plurality of control computers CBOX, and a plurality of process input-output equipment PI/O are connected to control network CN. Individual functions are distributed and stored using the objects by mounting the objects with monitoring and operation functions in computer COMP, mounting the objects with control function in control computer CBOX, and mounting the objects with process I/O functions in each of the process input-output equipment PI/O.

In the system shown in FIG. 11, client computers COMP1, server computer COMP2, control computers CBOX and each of the process input-output equipment PI/O are connected to control network CN. The objects having human machine interface functions, such as monitoring and operation functions and engineering operation functions, are not mounted in the client computers COMP1 in the initial state, but are loaded from the server computer COMP2 in the client computers COMP1 when such loading is necessary.

The objects with control functions are mounted in control computers CBOX and the objects with process input-output functions are mounted in the process input-output equipment PI/O.

The first embodiment provides the following advantages and effects: operation of the plant, an access method for accessing the information, and a viewing method to display the information in an optimum form.

Information component deck 513 is the object that offers a unified interface for accessing information component cassettes 514a–514n by arranging information component cassettes 514a–514n.

Monitoring and operation unit 515 carries out monitoring and operation of the plant based on an autonomous operation of the monitoring and operation object 512. Communication unit 516 implements communication between the objects via network 30. Display control unit 517 displays on the screen of display unit 1 the information related to monitoring and operation of the plant based on the autonomous operation of the information component cassettes 514a–514n. Alteration or change unit 518 dynamically adds or deletes the information component cassettes in the information component deck.

In computer 53, memory unit 531 offers a residing area for control object 532. The control object 532 controls the plant. Control unit 533 controls the plant based on an autonomous operation of the control object 532. The control object 532 performs the functions of the field control station FCS in conventional systems. Communication unit 534 implements communications between the objects via network 30.

In computer 54, memory unit 541 offers a residing area for the input-output object 542. The input-output object 542 controls signal converters 543 and 544 to input or output signals between the plant PLT and the computer 54. The input-output object 542 performs the function of the I/O unit in conventional systems. Communication unit 545 implements communication between the objects via network 30.

(1) Functions which configure a system become independent of the hardware and sofware board (OS). This frees the system from being subject to the physical restrictions such as certain functions having to be mounted on the same hardware.

(2) Function which configure a system are treated as objects, making the functions independent and self-sustaining. Thus, addition, deletion or change of a certain functioin does not affect the other functions. This makes the addition deletion or change of function possible while the system is being operated.

(3) Since the system configuration is based on software components, wherein the required function boards can be mounted as needed, the system desired by the user can be readily constructed at minimum cost and without waste of resources.

Second Embodiment

FIG. 12 shows a second embodiment wherein computers 51–54 are connected to network 30. In computers 51–54, objects each having a function to configure process control systems, are arranged in a distributed manner, thereby configuring a distributed object system.

In computer 51, memory unit 511 supplies residing areas for monitoring and operation functions object 512, information component deck 513 and information component cassettes 514a–514n. Monitoring and operation functions object 512 carries out plant operation and monitoring and acts as function of information command station ICS in conventional systems.

Information component cassettes 514a–514n are provided according to the types of information. Information component cassettes 514a–514n are the objects having the information related to monitoring and In computer 52, engineering unit 521 defines and creates obects and constructs a system by combining these objects. The engineering unit 521 stores the information on defined and created objects in object storage 522. Communication unit 523 implements communications between objects via network 30. The information cassettes and information component deck will be described in further detail hereinafter.

The information component cassettes are the objects containing the information related to the targets of monitoring and operation in process control systems. An information component cassette has an access method for accessing its internal information and also has a viewing method for displaying the information in an optimum form as desired. Examples of the information cassette are as follows:

(1) Tag process value and its viewing method.
(2) Tag historical data and viewing method thereof.
(3) Manual data related to tag types, for example, measuring instrument of the tag type, and viewing method thereof.
(4) Tag tuning data and viewing method thereof.
(5) Equipment managemetn data and viewing method thereof.

In addition, any of the data related to tags can be made to similar information components. The tags mentioned hereat are identifiers attached to control blocks that become configuration elements of a control system, measuring instruments that exist in a plant, etc.

The information component deck is provided to summarize the information component cassettes. The information component deck is an object that offers a unified interface for arranging individual information component cassettes and accessing information component cassettes.

The information component cassettes and information component deck will be described in further detail with referenc to FIG. 13, which shows an example of realization of an information component deck and an information component cassette. The information component deck is provided in the following form: An object, that is information component cassette, which uses a tag name as a key, is defined in the database. The form of database entity does not matter, but, the provision of the object is facilitated by using an object database. The data-base is divided into an "internal catalog part" and an "entity part". The "internal catalog part" is information component deck 60 and the "entity part" includes the information component cassette 71–74.

The information component deck 60 holds an "information list prepared". A tag name is provided to information component deck 60. A tag comment and basic classification are attached to a tag name. Examples of "information list prepared" are instrument type, tag detail, process current value, process historical value, process alarm history, engineering information, application information, equipment management information, etc. For example, information component cassettes 71–74 (also called "entity part") relating to each item of the "information list prepared" of the information component deck 60 are provided. The information component cassette 71 holds the measuring instrument type name as data, and the manual view (that is explanation of the measuring instrument type) as the viewing method. The information component casssette holds the process current value as data, and the face plate view and the digital display view as the viewing methods. The information component cassette 73 holds the tuning window view as the viewing method. The information component cassette 74 holds the historical value as data, and the trend view as the viewing method.

Although omitted from FIG. 13, information cassettes are also provided for the other information list items, in a similar manner. Information component cassettes hold methods of accessing data and the data themselves as desired. An information component cassette may further hold a standard viewing method. For example, an information component cassette holding the current process value holds the viewing method for the face plate and a simple viewing method for digital values. For the purpose of only displaying the process current value on the screen, it is sufficient to call up the viewing methods. The viewing method has a link to the display component file for viewing and displays a display compenent in the file if needed. Display control unit 517 holds the display component file. Information in the "internal catalog part" can be added or deleted dynamically and the related information can be added progressively after constructing the system. This enables functions to be expanded with flexibility as desired.

FIG. 14 shows how an information component deck is viewed from the outside and is an example of the display on the screen of an information component deck. When "View" is clicked, an instrument face plate will be displayed. When "Detailed view" is clicked, a tuning window will be displayed. When "Manual" is clicked, information for explaining classes of the object will be displayed. When "Application document" is clicked, information for explaining instance will be displayed. When "Engineering View" is clicked, information relating to the builder for construction of the system will be displayed.

Form the information component deck, the operator can request a list of information component cassette stored in the information component deck and can retrieve the required information or perform operations while displaying the information. In the information component deck 60 shown in FIG. 13, the equipment management information is also made part of the information stored in the information component cassette. The equipment management information may actually be included in the external dedicated database. In this case, it is sufficient for the data access method to be defined as an interface to access that database. The engineering function, and the like, for constructing a system may be handled by defining only a viewing method.

Although all interfaces for the engineering function cannot be actually be held as methods, an objective engineering window can be obtained by displaying a window for the engineering environment as a viewing mehtod and passing the relevant tag name as a parameter. In addition, the information component cassettes and the information component deck may reside in any computer and are not restricted to the case shown herein.

The second embodiment provides the following advantages and effects in addition to those described with reference to the first embodiment.

(1) The information component cassettes having individual information related to monitoring and operation functions and the methods that display the information in optimum form are readingly created. The information component cassettes are provided according to the types of information. Thus, various types of information can be displayed in an optimum form, which improves the operational environment.

(2) Since an information component deck is provided which arranges information component cassettes,the information required for monitoring and operation can be accessed effectively. Also, the mehtod of accessing various types of information can be unified.

(3) System expansion and improvement of the operational environment can be flexibly handled because the information component cassettes can be dynamically added or deleted in the information component deck.

Third Embodiment

FIG. 15 shows a third embodiment wherein a process control system is configured using a distributed object system similar to the second embodiment and comprises computers 53–56 connected to network 30. In computer 56, memory unit 561 offers residing areas for control objects 562a–562n and display objects 563a–563n. The control objects 562a–562n perform functions to control a plant. The display objects 563a–563n function as human interfaces required for monitoring and operation of a plant. For the control objects 562a–562n and display objects 563a–563n, the objects in both groups operating in association with each other are correlated, for example, like the relationship of the control object 562a to the display object 563a. Communication unit 564 executes communications betwene objects via network 30.

In computer 55, memory unit 551 offers residing areas for monitoring and operation function object 512 and display object 552. The display object 552 offers a screen display that functions as a human interface. The display object 552 is one to which any of the display objects residing in computer 56 has been downloaded. Display control unit 553 shows the screen display that functions as a human interface based on an autonomous operation of the display object 552. Communication unit 554 executes communications between the objects via the network 30.

In FIG. 15, the control object has the following functions:

(1) It controls a plant by controlling inputs and outputs of the plant.

(2) It sends control data to the display object.

(3) It receives setting data sent from the display object.

The display object in the embodiment of FIG. 15 has the following functions:

(1) It displays instrument face plates, meter face plates, and trend graphs, etc.

(2) It receives control data sent from the control object and dispays such data.

(3) It sends the data set by the operator to the control object.

FIGS. 16, 17 and 18 show examples of instrument face plates, meter face plates, and trend graphs, respectively. Tag names are provided to control objects and display objects. The same tag names are provided to a control object and display object that operate in association with each other. Such control object and display object recognize each other using the tag name as a key and data are exchanged between the control object and the display object to which the same tag names are provided.

The operation of the system of FIG. 15 is described with reference to FIGS. 19 and 20, wherein FIG. 19 is a diagram showing the flow of data in the system of FIG. 15, and FIG. 20 is a flow chart showing the procedures for control operation and display operation.

The combination of a control function and a display function comprises a function block. The control function is actualized by the control object and the display function by the display object. These control and display objects operate in association with each other. Function block information is provided which gives the details of a function block. It is sufficient for the function block information to be contained in any of the computers. The function blcok information contains information on the tag name, control function and display function. The tag name is provided to the control and display objects that operate in association with each other. An example of the control function information is PID control, and examples of display function information are instrument face plate, meter face plate, etc.

Control object K1 that actualizes the control function is correlated to the control function information. Also, display object K2 that actualizes the display function is correlated to the display function information. Upon start of control, control object K1 that actualizes the control function of the function block is downloaded to a computer in which control unit 533 resides, and display object K2 that actualizes the display function is downloaded to a computer in which display control unit 553 resides. The control object K1 executes the control operation and the display object K2 executes the display operation at each of the downloaded destinations, respectively.

The control object K1 and display object K2 detect each object taht operates in association with itself, respectively, by using the tag name as a key. This enables both control object K1 and display object K2 to recognize each other. The display object K2 that has recognized the partner receives the control data required for display from the control object K1 and displays the data. The display object K2 also sends the data set therein to the control object K1. The control object K1 that has recognized the partner sends the control data to the display object K2. The control object K1 also processes the set data sent from the display object K2. In this case, the correlated control object and the display object may reside in any computer and not be restricted to the case just illustrated.

The third embodiment has the following advantages and effects in addition to those previously discussed for the other embodiments.

(1) Control objects are provided for controlling a plant and display objects are provided for monintoring and operating the plant. The control object and display object related to each other are operated in association with each other. Thus, the control function and monitoring and operation functioin, that were originally integrated, can be displayed integrally on the screen. In addition, a mechanism is easily constructed which can reflect control data from the control function on the monitoring and operation display screen.

(2) Since the same tag names are provided to the control object and the display object that operate in association with each other, the control and display object can readily recognize an object that is to be operated in association with each other, the control object and display object can readily recognize an object that is to be operated in association with iteself, respectively.

(3) Since the display object displays the control data received from the correlated control object, the control data in the control function can be relfected on the display screen.

(4) Since the control object processes the received setting data sent from the correlated display object, the data set in monitoring and operation can be reflected on the control.

As described according to the invention, a process control system is realized that is more cost effective and offers better scalability, that is expandability of the system.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A process control system comprising:
   a network;
   a plant which has a process to be controlled;
   a plurality of computers connected to said network for communication therebetween, each of said plurality of computers comprising a memory unit with an object storage therein, said object containing a function which is independently changeable with use of software, said plurality of computers comprising a first computer having a first memory unit having an object therein with a process input-output function, a second comptuer having a second memory unit having an operation function, a third computer having a third memory unit having a control function, and a fourth computer having a fourth memory unit having a data processing function,
   said object of each computer memory unit having a different selected function with a combination of said functions of said memory units constructing a distributive process control in said plurality of computers with each object of each different memory unit sharing a function of the process control with at least another-object;
   means for providing process control signals between said plant and said first computer;
   means for providing an input signal to said second computer so that said operating function stored in said second memory unit causes said control function of said third computer memory unit to cause said input-output functions of said first computer memory unit to control the plant process utilizing said data processing function of said fourth computer memory unit and based on information previously stored in a separate memory unit and causing display of the resulting processed information related to said processing control, control whereby control is effected independently of hardware of the system and change of a particular function is attained without disturbing other functions.

2. The system of claim 1, wherein said objects have at least one of the following functions: monitoring and operating functions, an engineering function, a process input-output functions, data processing function, and a control function; and wherein any object shares with another object each of said functions.

3. The system of claim 1, wherein each object is stored with a name tag.

4. The system of claim 1, wherein said separate memory unit is contained in a separate computer, said separate computer also comprising: an engineering unit, an object information storage unit for storing object information data, and a communicating unit so that control of said plant is effected utilizing said engineering unit and said object information.

5. The system of claim 1, further comprising in each computer: a life cycle management unit which functions to manage, create, delete and move said objects, and an interface unit for exchanging information between said objects and carried out separately from providing said objects in said plurality of computers.

6. The system of claim 1, further comprising means for encapsulating each of said objects and wherein data characterization function of an object and a method of realizing a predetermined function utilizing data are integrated.

7. A process control system for controlling and operating a plant by controlling process variables existing in said plant, said system comprising:
   a network;
   a plurality of computers connected to said network for communication therebetween, said plurality of computers having a plurality of objects comprising data and operating functions which are changeable by software and are configured to provide a process control system;
   a first memory unit in said plurality of computers offering residing areas for a plurality of autonomously operable information component cassettes which are objects having a plurality of information related to monitoring and operating said plant, an access method for accessing said plurality of information, and a viewing method for displaying said plurality of information in an optimum form, each of said information component cassettes being provided with different types of information;
   input means for providing input signals to said first memory unit;
   a second memory unit in said plurality of computers offering residing areas for objects having a control function, object information, and input-output functions, so that responsive to input signals from said input means said plurality of computers cause said control function utilizing said input-output functions to cause control signals to be transmitted between said plurality of computers and said plant and based on said object information to monitor and operate said plant; and
   display control unit for displaying on a display screen information relating to monitoring and operating said plant based on autonomous operation of a component cassette having that information being displayed.

8. The system of claim 7, wherein said first memory unit further comprises residing areas for an information component deck that arranges the component cassettes in a selective manner and offers a unified interface for accessing the information in the component cassettes.

9. The system of claim 8, further comprising an alteration unit for dynamically adding or deleting one or more said plurality of component cassettes from or to said information component deck.

10. The system of claim 7, wherein said information component cassettes comprise accessing and viewing information.

11. The system of claim 10, wherein said accessing and viewing information are changeable with each cassette.

12. The system of claim 7, wherein said objects are tagged.

13. A process control system for controlling and operating a plant by controlling process variables that exist in said plant, said system comprising:

a network;

a plurality of computers connected to said network for communications therebetween, said plurality of computers having objects with data and operating functions which are configured to provide a process control system;

a memory unit provided in said plurality of computers and offering residing areas for a plurality of control objects performing functions for controlling said plant, and a plurality of display objects for displaying objects that function as human interfaces required for monitoring and operating said plant, wherein said plurality of control objects and said plurality of display objects are operated autonomously in association with each other;

control means provided in said plurality of computers for controlling said plant based on autonomous operation of said plurality of control objects in association with said plurality of display objects, and utilizing control signals transmitted between said plurality of computers and said plant; and a display control unit provided in said plurality of computers for displaying a screen that functions as a human interface based on autonomous operation of said plurality of display objects operated in association with said plurality of control objects;

wherein each of said plurality of computers has a distributed and arranged object which shares operating functions of the process control system and wherein said operating functions are represented by function blocks which are independent and autonomous.

14. The system of claim 13, further comprising:

means for downloading said plurality of control objects to a separate computer wherein said control means resides, and for down-loading display objects correlated to said control objects to a computer, wherein said display control resides, respectively, upon start of control; and means for causing said downloading of control object and display object to thereby exchange data with each other and thereby execute control and display operations.

15. The system of claim 13, further comprising:

means for assigning the same tag names to said control object and said display object that operate in association with each other so that both said control object and said display object recognize each other based on said tag names.

16. The system of claim 13, wherein said display object displays control data received from an associated control object.

17. The system of claim 13, wherein said control object causes processing of setting data received from an associated dispay object.

18. The system of claim 13, wherein said plurality of control objects include a control function in charge of process control, and wherein said plurality of display objects include a display object for monitoring and operating function and for displaying information related to process control.

19. The system of claim 18, wherein said display object has a display function in charge of displaying information required for process control.

20. A process control system comprising:

a network;

a plurality of computers connected to said network for communication therebetween; and a plurality of separate function blocks arranged in said said plurality of computers and convertible to a plurality of separate objects being combined to construct a process control system distributed and arranged in said plurality of computers with each distributed and arranged object sharing one or more functions of said process control system so that functions represented by said plurality of separate function blocks are independent and autonomous and so that a particular function is added, deleted or changed without affecting other functions and while said process control system is kept in continuous operation.

* * * * *